(12) United States Patent
Malkowicz et al.

(10) Patent No.: US 8,209,300 B2
(45) Date of Patent: Jun. 26, 2012

(54) ONLINE TRACKING OF LIFE-LIMITED PARTS

(75) Inventors: Warren Charles Malkowicz, Auburn, WA (US); Mariani Agus, Duvall, WA (US); Richard Yao-Tsung Chu, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 446 days.

(21) Appl. No.: 12/040,327

(22) Filed: Feb. 29, 2008

(65) Prior Publication Data
US 2009/0222427 A1 Sep. 3, 2009

(51) Int. Cl.
*G06F 17/30* (2006.01)
(52) U.S. Cl. ........ 707/689; 707/690; 707/694; 707/758; 707/708; 702/184
(58) Field of Classification Search ........................ None
See application file for complete search history.

(56) References Cited

U.S. PATENT DOCUMENTS

| | | | | |
|---|---|---|---|---|
| 6,067,486 | A * | 5/2000 | Aragones et al. | 701/29 |
| 7,167,786 | B2 * | 1/2007 | Sinex | 701/35 |
| 7,197,430 | B2 * | 3/2007 | Jacques et al. | 702/184 |
| 7,333,918 | B2 * | 2/2008 | Burrill et al. | 702/184 |
| 7,340,319 | B2 * | 3/2008 | Hawman et al. | 700/116 |
| 7,551,086 | B2 * | 6/2009 | Coop et al. | 340/572.1 |
| 7,734,659 | B2 * | 6/2010 | Lori | 707/802 |
| 2002/0193923 | A1 * | 12/2002 | Toyama et al. | 701/30 |
| 2003/0028297 | A1 * | 2/2003 | Iihoshi et al. | 701/33 |
| 2003/0084019 | A1 * | 5/2003 | Woodmansee | 707/1 |
| 2004/0220778 | A1 * | 11/2004 | Imai et al. | 702/188 |
| 2005/0043870 | A1 * | 2/2005 | Joshi et al. | 701/30 |
| 2005/0055239 | A1 * | 3/2005 | Farmer | 705/1 |
| 2005/0192860 | A1 * | 9/2005 | Kouda et al. | 705/10 |
| 2005/0246342 | A1 * | 11/2005 | Vernon | 707/9 |
| 2007/0156496 | A1 * | 7/2007 | Avery et al. | 705/8 |
| 2008/0159158 | A1 * | 7/2008 | Poisson et al. | 370/249 |
| 2008/0172268 | A1 * | 7/2008 | Wingenter | 705/7 |

OTHER PUBLICATIONS

Mxi Technologies, "Maintenix" www.mxi.com accessed Oct. 19, 2011.
Trax, "Trax" www.trax.aero accessed Oct. 19, 2011.
InfoTrust Group, "SkySuite" www.infotrustgroup.com accessed Oct. 19, 2011.
SwissAviation, "AMOS" www.swiss-as.com/main.do accessed Oct. 19, 2011.
"AirVault" www.airvault.com accessed Oct. 19, 2011.
Spec2000, www.spec2000.com accessed Oct. 19, 2011.
Ramco, www.ramcoaviation.com accessed Oct. 20, 2011.

(Continued)

*Primary Examiner* — Debbie Le
(74) *Attorney, Agent, or Firm* — Hope Baldauff Hartman, LLC

(57) ABSTRACT

This application describes tools for online tracking of life-limited parts. These tools may support methods that include receiving queries, and searching databases in response to the queries. These methods may integrate results of the searches into reports that provide comprehensive histories of life-limited parts for installation within vehicles, and may report these integrated results. To build these databases, other methods may receive information relating to the life-limited parts from a variety of sources, load the information into suitable databases, and integrate this information as provided by the various sources. Other methods may also evaluate whether the parts have any permitted life remaining. These tools may also provide databases that store serial numbers associated with the parts, store physical locations of the parts at various times, indicate who owned the parts at different times, and include remaining life records that indicate any permitted life remaining for the parts.

23 Claims, 4 Drawing Sheets

OTHER PUBLICATIONS

Safran Messier-Bugatti-Dowty, www.safranmbd.com accessed Oct. 19, 2011.
Applied Database Technology, ADT-Wings, www.adbtech.com accessed Oct. 20, 2011.
Skypaq, www.skypaq.com accessed Oct. 20, 2011.
AMICOS, Cimber Air Data, www.amicos.com accessed Oct. 20, 2011.
Aircraft Maintenance Systems, www.aircraftms.com accessed Oct. 20, 2011.
Rusada, www.rusada.com accessed Oct. 20, 2011.
InfoTrak, Location Intelligence Solutions, www.infotraksolutions.com accessed Oct. 20, 2011.
CommSoft Systems Development, OASES, www.commsoft.aero accessed Oct. 19, 2011.
Oracle, www.oracle.com accessed Oct. 19, 2011.
SAP, www.sap.com accessed Oct. 19, 2011.
SITA, www.sita.aero accessed Oct. 19, 2011.

* cited by examiner

000# ONLINE TRACKING OF LIFE-LIMITED PARTS

FIELD OF THE DISCLOSURE

This disclosure pertains generally to managing databases containing representations of parts included in manufactured vehicles, and pertains more specifically to tracking and administering life-limited parts within those vehicles.

BACKGROUND

In various industries, manufactured vehicles may include any number of parts that are life-cycle limited, whether by engineering design or by regulatory directive. In some cases, these life-limited parts may be installed on different vehicles, and a variety of different entities may direct with or operate on these parts over their lifetimes.

Previous approaches exist for tracking when particular parts are initially installed in manufactured vehicles. However, these approaches are generally static in nature, in that they are not updated over the lifecycle of the parts. Particularly with life-limited parts, these previous approaches may not provide detailed and comprehensive historical information on these parts. In these environments, tracking the status of these different parts, and determining their remaining operational life, may be problematic.

SUMMARY

It should be appreciated that this Summary is provided to introduce a selection of concepts in a simplified form that are further described below in the Detailed Description. This Summary is not intended to be used to limit the scope of the claimed subject matter.

This application describes tools for online tracking of life-limited parts. These tools may support methods that include receiving queries, and searching databases in response to the queries. These methods may integrate results of the searches into reports that provide comprehensive histories of life-limited parts for installation within vehicles, and may report these integrated results. To build these databases, other methods may receive information relating to the life-limited parts from a variety of sources, load the information into suitable databases, and integrate this information as provided by the various sources.

These tools may provide methods that include receiving information relating to life-limited parts for installation within a vehicle from one or more different sources. These methods may also load different instances of information for the life-limited parts into a database, and integrate information for a particular life-limited part within the database. These methods may evaluate whether given life-limited parts have any permitted life remaining.

These tools may also provide databases for tracking information pertaining to life-limited parts. These databases may include, for various life-limited parts, a serial number record for indicating a serial number associated with the parts. These databases may also include location history records for indicating one or more physical locations where the parts were located at various times in their lifecycles. Owner history records may indicate one or more owners associated with the parts, and remaining life records may indicate whether the life limited parts have any permitted life remaining.

The features, functions, and advantages discussed herein may be achieved independently in various embodiments of the present description or may be combined in yet other embodiments, further details of which can be seen with reference to the following description and drawings.

DETAILED DESCRIPTION

Figure 1:
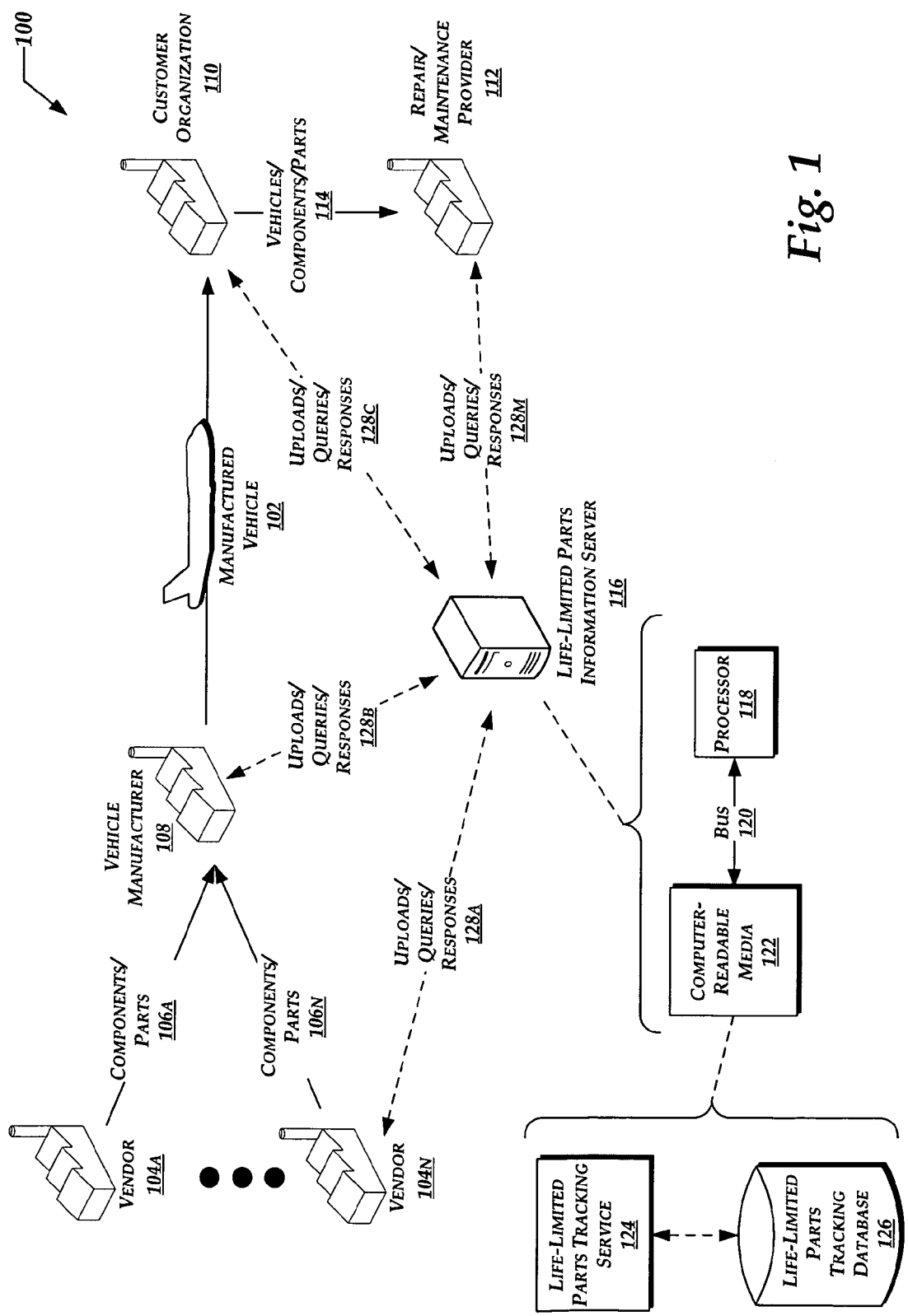
FIG. 1 is a combined block and flow diagram illustrating systems or operating environments for online tracking of life-limited parts.

The following detailed description discloses various tools and techniques for online tracking of life-limited parts. This description is provided along with the following drawings, which refer to various elements denoted by suitable reference numerals. Generally, the first digit in the reference numerals indicates the drawing in which the corresponding element first appears.

FIG. 1 illustrates systems or operating environments, denoted generally at 100, for online tracking of life-limited parts. These systems may operate with various different entities involved in manufacturing, operating, and/or maintaining various vehicles, or parts, components, assemblies, and/or subsystems included in such vehicles. FIG. 1 illustrates an example vehicle at 102, but it is noted that these systems 100 described herein may operate with any type of vehicle, whether air-based, sea-based, or land-based. To facilitate this description only, but not to limit possible implementations of this description, this discussion provides various examples related to aircraft and related subassemblies (e.g., landing gear).

Turning to FIG. 1 in more detail, one or more vendors 104a and 104n (collectively, vendors 104) may provide components and/or parts 106a and 106n (collectively, parts 106) to a vehicle manufacturer 108. The parts 106 shown in FIG. 1 are understood to represent individual parts, as well as components assembled using such individual parts.

The vehicle manufacturer 108 may obtain components/parts from any number of different vendors, and they manufacture the vehicle 102 from such parts. In turn, the manufacturer 108 may provide the vehicles to one or more customers 110. In different examples, the customers 110 may purchase, lease, license, or otherwise obtain rights to possess or use the manufactured vehicles.

Over time, the vehicles may become due for repairs, maintenance, overhauls, or other prescribed procedures. In some instances, the customers 110 may perform these procedures themselves. In other instances, the customers may arrange with third parties to perform these procedures. To represent either scenario, FIG. 1 provides an example repair/maintenance provider 112, which may represent an in-house facility maintained by the customers, or may represent a third-party facility to whom the customer outsources these functions. For example, the airline industry sometimes refers to these third-party facilities as maintenance repair organizations (MROs).

In some cases, the repair/maintenance providers 112 may operate on entire vehicles. In other instances, the vehicles may be at least partially disassembled, with individual parts or components thereof then sent to the repair/maintenance providers 112, as represented generally at 114.

These systems 100 may include one or more server systems 116 that provide online systems for tracking life-limited parts included within the vehicles 102. The term "life-limited parts" (abbreviated "LLPs") as used herein refers to particular parts of the vehicles that have a predefined life, whether measured and expressed in terms of time, duty cycles, or any other convenient measure or criterion. For example, in the domestic airline industry, the Federal Aviation Administration (FAA) may promulgate regulations that specify the service lifetimes of various parts included within aircraft. However, other entities may specify the lifespan of life-limited parts. For example, these entities may include the vendors (e.g., 104) who manufactured the parts, the manufacturers (e.g., 108) who build the vehicles using the parts, or other entities as well.

In an aviation context, an airplane's Type Certificate (TC) may reference life-limited parts, for example, non-failsafe principle structural elements such as landing gear. The term "fail safe" refers to scenarios in which a backup or redundant system or structure may take over in case a primary system or structure malfunctions. Since aircraft designs typically cannot afford the weight penalty to carry redundant landing gear, the landing gear structures may be life-limited, and replaced after the life-limit expires.

The server systems 116 may communicate with any number of external entities, for example, over suitable networks (not shown in FIG. 1). The type and configuration of such communication networks may vary in different implementations. For the purposes of describing FIG. 1, but not to limit possible implementations, examples of such external entities may include the vendors 104, the manufacturers 108, the customers 110, the repair providers 112, or the like.

Turning to the server systems 116 in more detail, these systems may include one or more processors 118, which may have a particular type or architecture, chosen as appropriate for particular implementations. The processors 118 may couple to one or more bus systems 120 that are chosen for compatibility with the processors 118.

The server systems 116 may include one or more instances of computer-readable storage media 122, which couple to the bus systems 120. The bus systems may enable the processors 118 to read code and/or data to/from the computer-readable storage media 122. The media 122 may represent storage elements implemented using any suitable technology, including but not limited to semiconductors, magnetic materials, optics, or the like. The media 122 may include memory components, whether classified as RAM, ROM, flash, or other types, and may also represent hard disk drives.

The storage media 122 may include one or more modules 124 of software instructions that, when loaded into the processor 118 and executed, cause the server 116 to provide tracking services for life-limited parts. These modules may implement the various data structures, databases, and process flows described and illustrated herein.

The storage media 122 may include one or more databases 126 that store information related to particular parts, in connection with the online systems for tracking life-limited parts. In addition, the services provided by the modules 124 may cooperate with the database 126 in providing the online systems for tracking life-limited parts, as described in further detail below.

FIG. 1 illustrates the server systems 116 individually and as a central system only to facilitate this description. In some instances, the server systems 116 may be implemented separately from, for example, the vendors 104, the manufacturers 108, the customers 110, and the repair providers 112. However, in other instances, one or more of these entities may operate and maintain the server systems 116, in whole or in part, on behalf of the other entities. For example, the manufacturer 108 may operate the server systems on behalf of other entities, such as those examples shown in FIG. 1. In other examples, the functions allocated in this description to the server systems 116 may be distributed across several entities, such as those shown in FIG. 1.

In general, the server systems 116 may integrate information relating to life-limited parts over the lifetime of the parts, and may provide this information on-demand to one or more entities. FIG. 1 provides examples in which these various entities may upload parts-related information to the server system 116. These entities may query the server systems 116 for information related to particular parts, and may receive responses to these queries. More specifically, FIG. 1 denotes at 128a examples of uploads, queries, and/or responses between the vendors 104 and the server systems 116. Similarly, FIG. 1 represents at 128b uploads, queries, and/or responses between the manufacturer 108 and the server systems 116, denotes at 128c uploads, queries, and/or responses between the customers 110 and the server systems 116, and denotes at 128m uploads, queries, and/or responses between the repair providers 112 and the server systems 116.

Having described the overall systems 100 for online tracking of life-limited parts in FIG. 1, the discussion now proceeds to a more detailed description of inputs, outputs, and data flows related to online tracking of life-limited parts. This discussion is now presented with FIG. 2.

Figure 2:
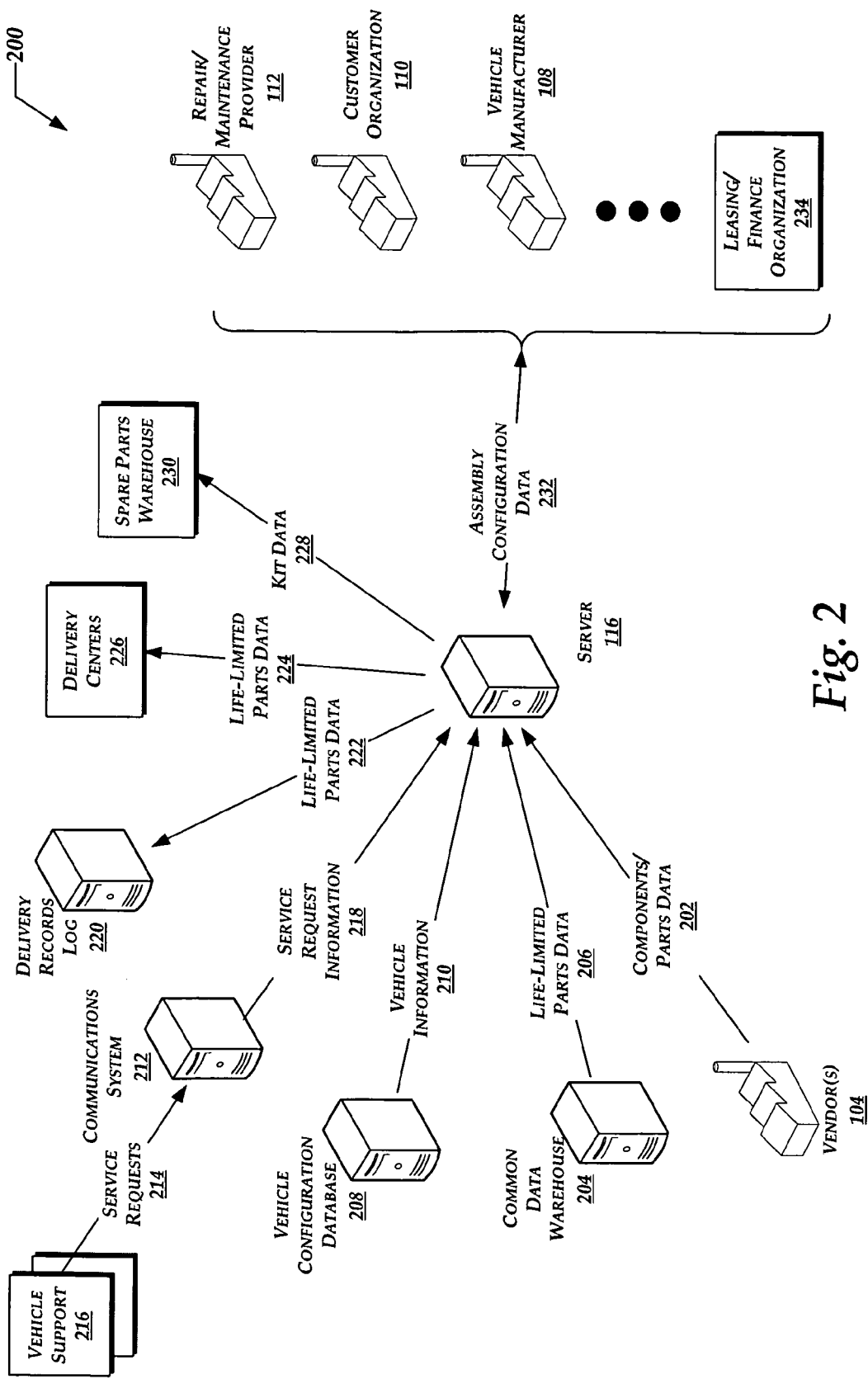
FIG. 2 is a combined block flow diagram illustrating additional aspects of inputs, outputs, and data flows related to online tracking of life-limited parts.

FIG. 2 illustrates additional aspects, denoted generally at 200, of inputs, outputs, and data flows related to online tracking of life-limited parts. For ease of illustration and description, but not to limit possible implementations, FIG. 2 may carry forward some elements from previous figures, and denote them with identical reference numbers. For example, FIG. 2 carries forward examples of the vendors at 104, the server system 116, the repair provider 112, the customer 110, and the manufacturer 108.

Turning to FIG. 2 in more detail, the server system 116 may receive inputs from a variety of sources, with FIG. 2 providing several non-limiting examples of such sources. For example, the vendors 104 may upload information relating to various parts or components that they may provide to the manufacturer 108, as denoted generally at 202. While FIG. 2 illustrates one vendor 104, it is noted that any number of vendors may provide inputs to the server systems 116. To promote system security, and to protect the server systems 116, hardware and/or software firewalls (not shown) may be deployed as appropriate. In addition, the server systems 116 may define and support any number of upload interfaces, as appropriate depending on the type and nature of the systems deployed by the vendors.

A common data warehouse 204 may provide information relating to a variety of life-limited parts, as denoted generally at 206. In some implementations, the vehicle manufacturer 108 may operate and maintain the common data warehouse. For example, the common data warehouse may list life-limited parts included within a given vehicle, organized as appropriate in different given applications.

A vehicle configuration database 208 may provide information 210 on particular vehicles. For example, the vehicle configuration database may include firing order information. The firing order may specify the order in which manufactured vehicles leave the factory. The firing order may provide a list of delivered vehicles, makes/models of the vehicles, identifiers for the vehicles, customers who obtained such vehicles, and may indicate the dates on which these customers received the vehicles. The firing order may also indicate past and future delivery information that includes delivery dates, delivery owners, delivery operators, current owner and/or operator, engine numbers, tail numbers, applicable registries, or the like A communication system 212 may serve as a collecting point or clearinghouse for service requests 214 submitted by customers of the vehicle support organizations 216. The communication system 212 may provide an online portal between customers, maintenance facilities, manufacturers, and/or other entities. Through this portal, these various parties may indicate questions and answers relating to practices, procedures, repairs, technical information, troubleshooting, reporting errors and manuals, as well as reporting atypical operations or other special unique conditions. More specifically, the communication system 212 may collect service requests 214 on behalf of one or more different vehicle support organizations 216, and submit them to the server system 116, as denoted at 218. In this manner, the vehicle support organizations 216 may communicate with the server system 116 through the centralized communication system 212. In some implementations, the vehicle support organizations 216 may be in-house organizations maintained by, for example, any of the entities shown in FIG. 1.

In example scenarios, the service requests 214 may report, via the communication system 212, activities performed by vehicle support organizations 216 that relate to certain parts. In turn, the communication system 212 may load certain aspects of these reports into the server 116 via service requests 218. For example, if a part has been damaged during service and repaired, these requests 218 may report such incidents, date-stamped appropriately. These incidents may automatically go into the history for a particular part/serial number, as stored in the server 116 as a permanent record. In this manner, the system may relieve customers (e.g., 110) or repair organizations (e.g., 112) from entering these incidents manually.

Other examples of these service requests 218 may include requests to provide a "back to birth" history or report of part numbers and/or serial numbers within a given vehicle, for example in connection with a transaction involving the given vehicle. This "back to birth" history may compile part history reported by several different sources over the lifetime of vehicle, and may identify discrepancies involving serial numbers and/or part numbers appearing in these reports. In turn, these discrepancies may be reported as appropriate for resolution.

A delivery records log 220 may store information 222 related to particular life-limited parts tracked by the server systems 116. For example, the delivery records log 220 may store LLP information 206 provided by the common data warehouse 204. In some implementations, the delivery records log 220 may store relatively static information relating to particular parts. For example, previous implementations of delivery records logs may have stored the dates that particular parts were initially delivered to particular customers. However, these previous implementations may not have updated the status of these parts after they were initially delivered to customers. In contrast, the server systems 116 and related services 124 and databases 126 may store dynamic lifetime information for these particular life-limited parts, integrating status information provided by a variety of different sources over the lifetime of these life-limited parts.

The server systems 116 may provide information 224 related to life-limited parts on-demand to delivery centers 226. The delivery centers generally represent infrastructure related to delivering vehicles to customers. In some instances, the manufacturer may provide delivery records (e.g., 220) relating to the vehicle to the customer, with these delivery records listing specific equipment installed on vehicle, along with identifying any life limited parts.

These server systems 116 may provide kit data 228 to spare parts warehouses 230. For example, the spare parts warehouses may organize or group spare parts into kits that the warehouses then make available, for example, to customers (e.g., 110), to repair providers (e.g., 112), or to other entities. In example scenarios, the spares warehouses 230 may collect individual parts and build assemblies for sales as spares, define kits 228 of such parts available for sale as spares, and provide data relating to these kits 228 to the server 116. In some cases, the vendors 104 may have already loaded part data (e.g., 202 in FIG. 2 or 106 in FIG. 1) into the server system 116. In these cases, the spares warehouses 230 may retrieve such part data, and update or provide additional data to the server 116.

In general, the server systems 116 may provide assembly configuration data 232 to a variety of entities. For example, the assembly configuration information 232 may represent any aspect of information relating to life-limited parts, relevant to any point in the lifetime of these parts. In addition, the assembly configuration information may represent information about particular individual parts, or may represent information about assemblies or components including two or more individual parts.

As shown in the example of FIG. 2, the server systems 116 may exchange assembly configuration data 232 with, for example, repair providers 112, customers 110, vehicle manufacturers 108, or other entities not shown in FIG. 2. In general, the assembly configuration data 232 may represent any actions taken relative to life-limited parts over the lifetime of the parts. Examples of these actions may include, but are not limited to:

storage of the parts over some period of time,
installation of the parts into one or more different vehicles over time,
association or assembly of given parts with one or more other given parts over time, and/or
services related to repairing, reconditioning, refurbishing individual parts, or assemblies including individual parts,
regulatory directives affecting individual parts or assemblies of such parts (e.g., air worthiness directives that may be issued by the FAA).

The server systems 116 may also exchange assembly configuration data 232 with one or more leasing or finance organizations 234. For example, such leasing or finance organizations may have financial stakes or interests (e.g., security interests, collateral rights, or the like) in complete vehicles, assemblies of parts or components, individual parts, or the like. These leasing or finance organizations (or other entities described herein) may investigate the pedigree or heritage of any collateral in which they have an interest by interacting with the server systems 116. More specifically, these leasing or finance organizations may perform due diligence associated with acquiring new collateral interests, or with maintaining existing collateral interests. In addition, the organizations 234 may be involved in outright sales, in which vehicles (e.g., airplanes, airplane parts, or the like) are transferred between owners (e.g., airlines 110).

In addition, those who lease or finance vehicles or parts may query the server system 116 to determine when payments are due for these vehicles or parts. In other scenarios, lessees may query the server system 116 to determine when lease returns are due, thereby minimizing late fees.

Having described the additional aspects of inputs, outputs, and data flows related to online tracking of life-limited parts in FIG. 2, the description now turns to a discussion of illustrative structures and layouts for the databases for tracking life-limited parts. This description is now provided with FIG. 3.

Figure 3:
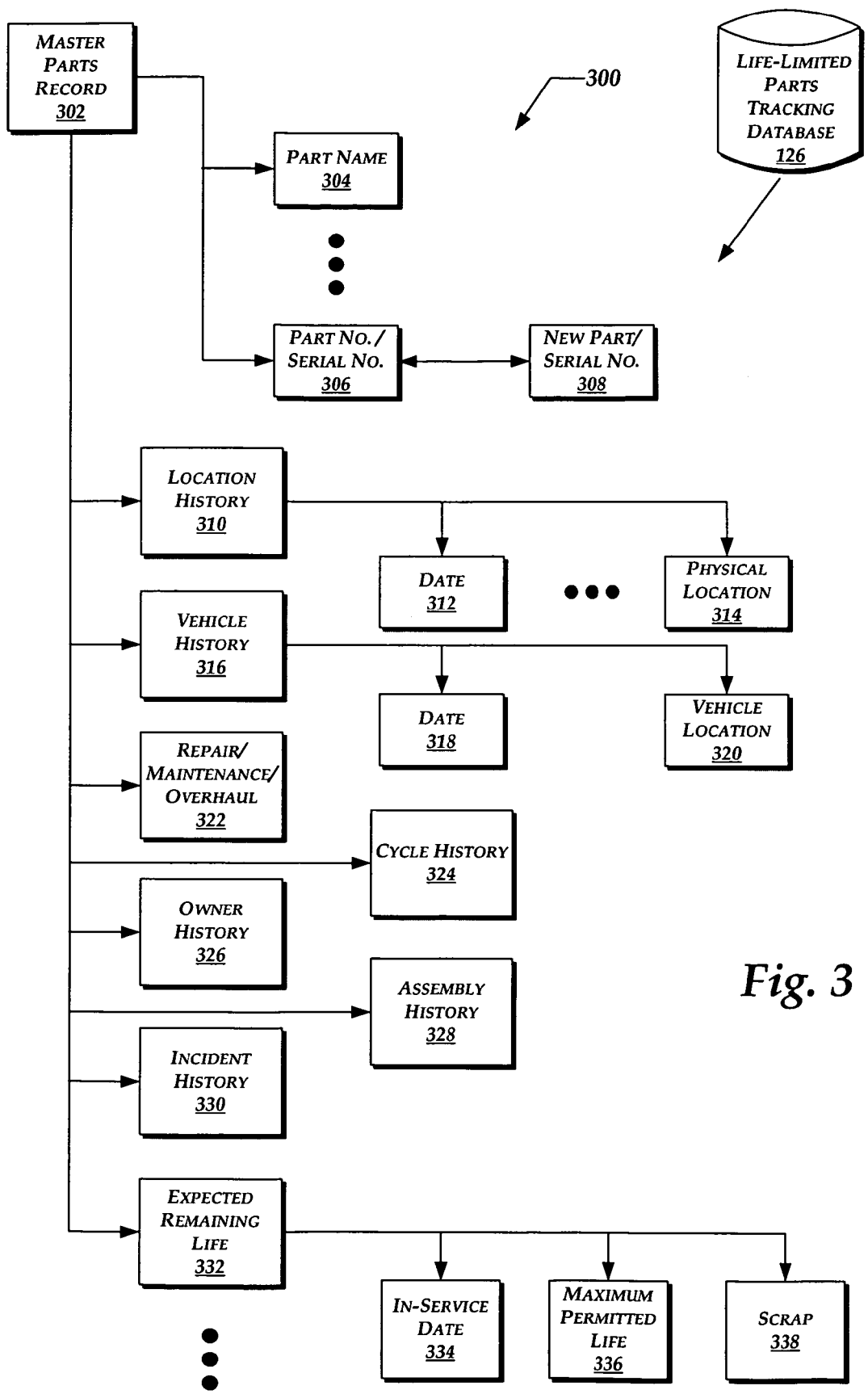
FIG. 3 is a database diagram illustrating examples of structures and layouts of databases for online tracking of life-limited parts.

FIG. 3 illustrates examples of structures and layouts, denoted generally at 300, of databases for tracking life-limited parts. For ease of illustration and description, but not to limit possible implementations, FIG. 3 may carry forward some elements from previous figures, and denote them with identical reference numbers. For example, FIG. 3 carries forward an example of the parts tracking database 126.

Turning to the structures and layouts of the database 126 in more detail, a master parts record 302 may organize various fields and records that store information about a given part. The master parts record 302 may be associated with a field 304 that stores a name for the part, and/or one or more fields 306 that stores a serial number and/or part number associated with the part. To promote clarity in FIG. 3, the field 306 may represent part numbers and/or serial numbers associated with particular parts. In some instances, a given part may be associated with different part numbers over its lifetime. For example, a repair service provider (e.g., 112) may refurbish a given part using established procedures, and then associate the refurbished part with a new part number 308. In some cases, the refurbished parts may also be assigned new serial numbers. In such scenarios, the database 126 may associate or track between the first and second serial or part numbers, as represented by the arrow connecting blocks 306 and 308, to provide a complete history or pedigree of the refurbished part.

The database 126 may enable the server system 116 to check uniqueness for part and serial numbers. Generally, duplicate or missing serial or part numbers are not permitted. When processing data representing new parts, the server system 116 may detect any missing or duplicate serial or part numbers, and flag or report them to the vendors 104. In response to these reports, the vendors may double check for errors, or possibly re-part mark accordingly. The term "re-part mark" refers to modifying the original part mark, i.e., the part and serial number identifiers. The initial part mark is effectively over-ridden by a re-part marking, thereby changing the part and/or serial number for that part. The re-part marking may describe a revision to the original part marking that is defined by engineering drawings that prescribe location, letter size, depth, technique, or the like.

When processing data representing existing parts, the server system 116 may also detect duplicate or missing numbers, and report them appropriately. In addition, the server 116 may modify a duplicate serial number by adding an airplane ID as a suffix, to flag this duplicate number for resolution. For missing serial numbers, the server 116 may automatically generate a serial number, and flag this generated serial number for resolution when the part is brought into a shop for maintenance or overhaul.

The database 126 may contain records that provide location history 310 for a given part. For example, the location history records may include one or more date records 312 that are associated with physical location records 314. In combination, the date records 312 and the physical location records 314 may indicate where a given part was located or stored at different times in its lifecycle.

The database 126 may contain vehicle history records 316 that indicate which particular vehicles a given part was installed in different times in its lifecycle. For example, the vehicle history records 316 may include date records 318 and/or vehicle location records 320 that store particular instances of vehicle installations, and when particular parts were installed in those vehicles.

Records 322 may store information relating to particular repairs, maintenance procedures, refurbishments, overhauls, and/or other instances of services applied to a given part. Different instances of the repair records 322 may correspond to different instances of particular repairs or services, as indicated in FIG. 3. These repair records 322 may indicate who performed particular repairs and services, the nature of the repairs or services, may indicate dates on which repairs or services occurred, and/or may indicate other suitable information relating to repairs. In this manner, the repair records 322 may store historical repair information collected and integrated over the lifetime of particular life-limited parts.

In cases where particular parts are subject to periodic operations or duty cycles within their lifetimes, records 324 may indicate how many cycles a given part has undergone at particular points in its life. For example, assuming an aviation application, a particular part included with an aircraft landing gear may be rated to undergo a given number of takeoffs and landings (i.e., periodic duty cycles).

Records 326 may indicate who owned a particular part at different points in its lifetime. In this manner, the owner records 326 may enable interested parties to investigate ownership history of a particular part.

In some instances, a given part may be included as part of a greater component, sub-assembly, or assembly, with one or more other parts. In these scenarios, assembly history records 328 may indicate, for a given part, any such assemblies of which the part was a member. The assembly history records 328 may indicate other parts included in such assemblies, and may indicate the times during which the given part was a member of such sub assemblies.

Incident history records 330 may contain information indicating particular incidents in which a given part has been involved during its lifetime. Within an illustrative aviation context involving landing gear, examples of such incidents may include, but are not limited to, hard landings, off-runway incidents, shimmy or vibration incidents, incidents in which the aircraft was damaged during towing, or the like. Generally, the incident history records 330 may store data for incidents that are considered abnormal for a particular part, and may adversely affect the performance or expected lifetime of the particular part. The incident history records 330 may indicate when and where these incidents occurred, and may include a narrative description of the type or nature of the incident.

Expected remaining life records 332 may indicate how far along a given LLP is within its expected or permitted lifecycle. In different scenarios, LLPs may have their service lives expressed in terms of time, periodic duty cycles, mileage, or other suitable criteria. The type and structure of the expected remaining life records 332 may adapt to the criteria used to specify lifecycle of the LLPs. For example, FIG. 3 illustrates a scenario in which the lifecycle of an LLP is expressed in terms of time. In such scenarios, the expected remaining life records 332 may include an in-service date record 334 and a maximum permitted life record 336. Based on the in-service date 334 and the maximum permitted life 336, the expected or permitted remaining life may readily be calculated. It is noted that the example records 334 and 336 may be adapted to other criteria applicable to defining the permitted lifetimes of LLPs.

The expected remaining life records 332 may include records 338 indicating that a given particular part is to be scrapped, or already has been scrapped. A given part may be scrapped for a variety of reasons, including but not limited to, reaching its maximum permitted lifetime (whether expressed in terms of time, mileage, duty cycles, or the like), regulatory directive (e.g., FAA airworthiness directives), or other factors.

In describing the illustrative records and structures of the tracking database 126, several observations are noted. The layout shown in FIG. 3 is chosen only for ease of description and illustration, but does not limit possible implementations. In addition, implementations of the tracking database 126 may or may not include all of the features or arrangements shown in FIG. 3, and may include features or arrangements other than those shown in FIG. 3.

Having described the records and structures of the tracking database in FIG. 3, the discussion proceeds to a description of process flows related to online tracking of life-limited parts. This description is now provided with FIG. 4.

Figure 4:
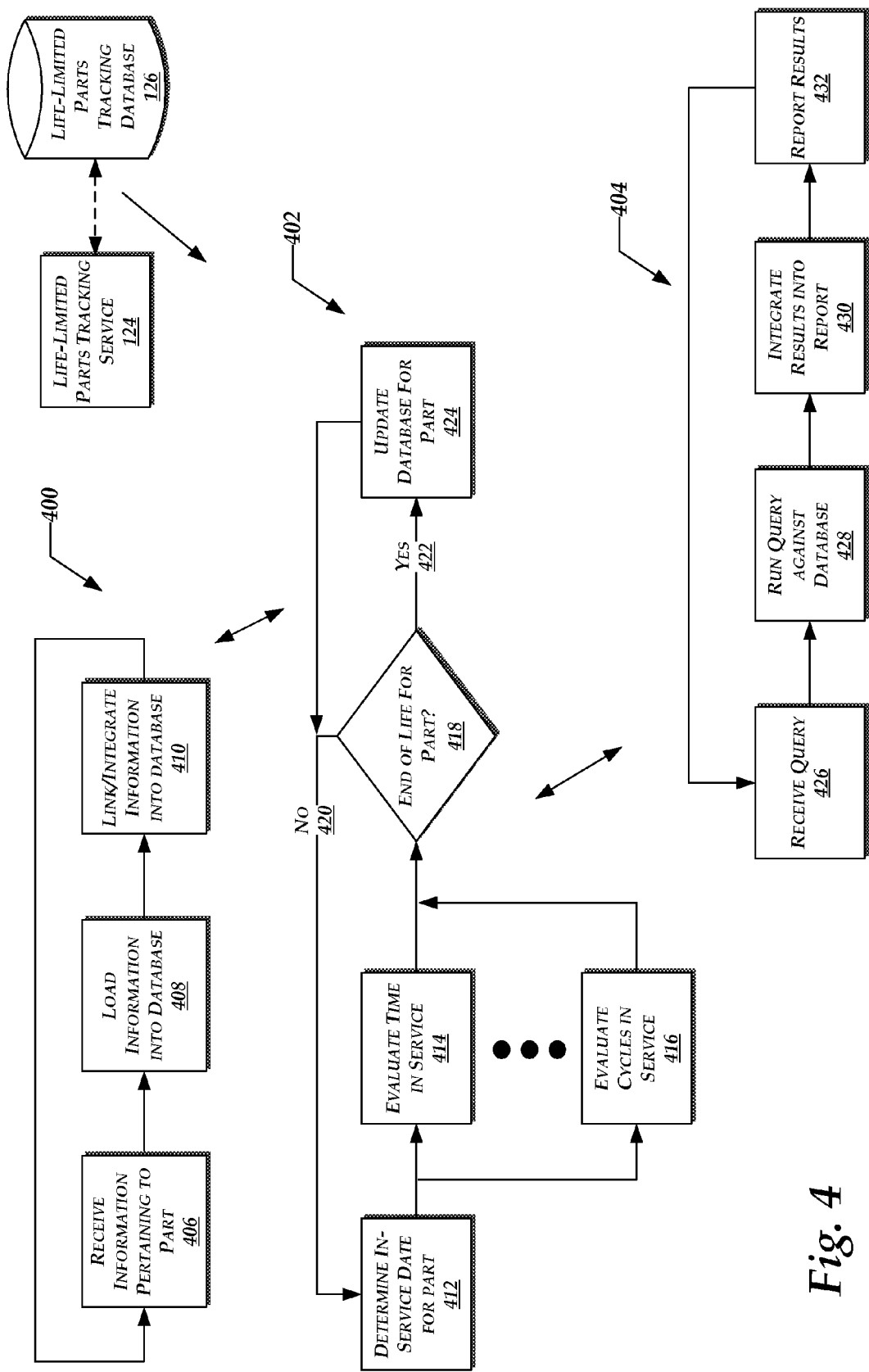
FIG. 4 is a flow diagram illustrating processes related to online tracking services for life-limited parts.

FIG. 4 illustrates process flows, denoted generally at 400, 402, and 404, related to online tracking services for life-limited parts. For ease of illustration and description, but not to limit possible implementations, FIG. 4 may carry forward some elements from previous figures, and denote them with identical reference numbers. For example, FIG. 4 carries forward examples of the parts tracking database 126 and the parts tracking service 124, which may cooperate to perform any one or more of the process flows 400, 402, and 404.

Turning to the process flows 400 in more detail, these flows generally represent ongoing processes that the tracking service 124 may run to receive information related to life-limited parts, and to integrate this information into one or more tracking databases (e.g., 126). More specifically, block 406 represents receiving information related to a given life-limited part. Block 406 may include receiving parts-related information from one or more sources, non-limiting examples of which are shown in the preceding figures (e.g., vendors 104, manufacturers 108, customers 110, repair service providers 112, or the like). For example, block 406 may include receiving information about a new part, or receiving indications that an existing part has been installed into a vehicle, has been repaired in some manner, has been placed into storage, has been scrapped, or the like.

Block 408 generally represents loading the received information into the tracking database. For example, block 408 may include updating existing fields or records within the tracking database, creating new fields or records as appropriate, or the like.

Block 410 generally represents linking and/or integrating the received information into the tracking database. More specifically, block 410 may include creating any supplemental links or data structure relationships appropriate for creating reports or responding to queries routed to the tracking database.

After performing block 410, the process flows 400 may return to block 406 to receive additional information from other sources related to a given part. In other instances, different instances of the process flows 400 may run concurrently to receive information relating to any number of parts.

Turning to the process flows 402 in more detail, these flows generally represent ongoing processes that the tracking service 124 may run to analyze parts-related information stored in the tracking database at any given time. More specifically, block 412 generally represents determining an in service date for one or more given life-limited parts stored in the tracking database. In scenarios where life-limited parts are evaluated based on time in service, block 414 generally represents evaluating how long a given part has been in service, and may include accounting for any time that the part has spent in storage and not in use. In scenarios where life-limited parts are evaluated based on cycles in service, block 416 generally represents evaluating how many cycles a given part has spent in service. It is noted that other techniques are possible for evaluating how much service life remains in a given part at a given time, with the process represented in blocks 414 and 416 provided only as examples.

Decision block 418 generally represents determining whether a given life-limited part has reached the end of its service life at a given time, whatever technique is used to measure the service life of this part. If the given part has not reached the end of its service life, the process flows 402 may take No branch 420 to return to block 412. At this point, the process flows 402 may repeat to analyze the same given part, or may select another part for analysis, returning later to analyze the given part again.

Returning to decision block 418, if the given part has reached the end of its service life, the process flows 402 may take Yes branch 422 to block 424. Block 424 represents updating the tracking database for the particular part, to indicate that the part should be scrapped. Afterwards, the process flows 402 may return to block 412 to process another given part.

Turning to the process flows 404 in more detail, these flows generally represent ongoing processes for receiving and responding to queries directed to the tracking database 126. More specifically, block 426 generally represents receiving a query directed to the tracking database. Block 426 may include receiving a query from, for example, entities such as the vendors 104, the vehicle manufacturers 108, the customers 110, the repair services providers 112, or other interested parties. FIG. 1, discussed above, provides examples of these input queries, denoted at 128. Without loss of generality, these input queries may reference particular parts by name, serial number, and/or model number, particular assembled vehicles, components installed within such vehicles, or assemblies including particular parts, or the like. In general, these queries may reference any data item stored in a tracking database (e.g., 126).

Block 428 generally represents running the input query against the tracking database to identify any responsive contents within the database. More specifically, block 428 may include searching the tracking database using any input keys included within the query.

Block 430 generally represents integrating search results into a report provided as a response to the input query. For example, assuming that the input query references a given part number, block 428 may include searching the database for any records or fields associated with this part number. As described previously, the database may include some records that are indexed according to time, with these records providing various information about the part at different points in time. In this example, block 430 may include integrating these various time-sensitive records into a timeline representation that presents a chronological history of the given part number. Such a timeline representation may indicate periods of time spent by the part in storage, installed on particular vehicles, owned by particular customers, assembled into components with other parts, or the like.

Block 432 generally represents providing a response to the input query. More specifically, block 432 may include providing the report created in block 430. In this manner, the process flows 404 may enable any interested party to visualize comprehensive legacy/heritage information for life-limited parts, gathered from a variety of different sources. This heritage information may indicate, for a given part, where it was stored over different periods of time, who owned the part over different periods of time, the various vehicles on which the part was installed at different times, any abnormal operational incidents in which the part was involved, who repaired or refurbished the part at different times, when the part may be due for return to a lessor, how much operational lifetime remains for the part at a given time, or the like.

Having provided the foregoing description of the drawing figures, several observations are noted. The process flows 400, 402, and 404 may be performed concurrently with one another, as indicated by the arrows between the representations of the process flows 400, 402, and 404 in FIG. 4. The server systems 116 and related online tracking database 126 and tracking services 124 may provide an integrated data source for a variety of life-limited parts, and may provide "back-to-birth" traceability for these parts. While the features of these systems are described with examples of life-limited parts, some aspects of this description may also be applicable to tracking non-life-limited parts.

In some cases, the foregoing drawings may include bidirectional or unidirectional arrows representing process and/or data flows between various components. However, it is noted that these representations are chosen only for convenience in providing this description, and not to limit possible implementations. More specifically, the use of unidirectional arrows in these drawings does not exclude or disclaim implementations that include bidirectional process or data flows.

In addition, the foregoing drawings may depict one instance of particular elements, only for clarity of illustration and ease of discussion. However, the representations do not limit implementations of this description, which implementations may include one or more of these various elements, as appropriate.

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

What is claimed is:

1. A computer-based method comprising:
receiving, at a server of a first entity, a query referencing a life-limited part;
responsive to receiving the query, searching a database for lifetime information associated with the life-limited part, the lifetime information being provided by at least a second entity throughout a lifetime of the life-limited part;
receiving, at the server, the lifetime information associated with the life-limited part; and
integrating, at the server, the lifetime information into a report providing a comprehensive history of the life-limited part for the lifetime of the life-limited part;
wherein the comprehensive history of the life-limited part comprises information associated with any actions taken over the lifetime of the life-limited part that correspond to at least one of the following
storage of the life-limited part for any period of time during the lifetime of the life-limited part,
installation of the life-limited part into a vehicle for any period of time during the lifetime of the life-limited part,
association or assembly of the life-limited part with another life-limited part for any period of time during the lifetime of the life-limited part,
services related to repairing, reconditioning or refurbishing the life-limited part, and
regulatory directives affecting the life-limited part.

2. The method of claim 1, wherein integrating the lifetime information into the report comprises creating a chronological representation of a plurality of events that occurred within the lifetime of the life-limited part.

3. The method of claim 1, wherein receiving the query referencing the life-limited part comprises receiving a request for the comprehensive history of the life-limited part for the lifetime of the life-limited part.

4. The method of claim 1, further comprising checking for uniqueness of at least one of a part number associated with the life-limited part and a serial number associated with the life-limited part.

5. The method of claim 1, further comprising identifying at least one of a duplicate identifier associated with the life-limited part and a missing identifier associated with the life-limited part.

6. The method of claim 5, further comprising re-part marking the life-limited part in response to identifying at least one of the duplicate identifier associated with the life-limited part and the missing identifier associated with the life-limited part.

7. The method of claim 1, wherein the first entity is a customer, and the second entity comprise one of a repair provider and a vehicle manufacturer.

8. A computer-based method comprising:
receiving, via a computer, from a first source, a first instance of information relating to a life-limited part;
receiving, via the computer, from at least a second source, at least a second instance of information relating to the life-limited part, wherein at least one of the first instance of information and the second instance of information provides a comprehensive history of the life-limited part throughout a lifetime of the life-limited part;
loading the first instance of information and the second instance of information for the life-limited part into a database;
integrating the first instance of information and the second instance of information within the database forming integrated information;
calculating, via the computer, a permitted life remaining for the life-limited part based upon an in-service date record for the life-limited part and a maximum permitted life record for the life-limited part, the integrated information comprising the in-service date record and the maximum permitted life record;
evaluating, via the computer, the permitted life remaining for the life-limited part to determine whether the life-limited part has any permitted life remaining; and
upon evaluating that the life-limited part does not have any permitted life remaining, designating the life-limited part for scrap.

9. The method of claim 8, wherein evaluating whether the life-limited part has any permitted life remaining based on the integrated information comprises evaluating whether the life-limited part has reached or exceeded a maximum permitted life expressed in terms of time.

10. The method of claim 8, wherein evaluating whether the life-limited part has any permitted life remaining based on the integrated information comprises evaluating whether the life-limited part has reached or exceeded a maximum permitted life expressed in terms of duty cycles.

11. The method of claim 8, wherein receiving the first instance of information comprises receiving comprehensive vendor history information from a vendor associated with the life-limited part.

12. The method of claim 11, wherein receiving the second instance of information comprises receiving comprehensive manufacturing history information from a manufacturer that installed the life-limited part into the vehicle.

13. The method of claim 12, further comprising receiving a third instance of information, the third instance of information comprising comprehensive ownership history information from an owner associated with the life-limited part.

14. A computer-readable storage medium containing a database for tracking information related to a life-limited part, the database comprising:
- a serial number record for indicating a serial number associated with the life-limited part;
- a location history record for indicating a geographical location where the life-limited part was located at a time;
- an owner history record for indicating an owner associated with the life-limited part;
- an in-service date record for the life-limited part;
- a maximum permitted life record for the life-limited part; and
- a remaining life record for indicating whether the life-limited part has any permitted life remaining, the remaining life record being calculated from the in-service date record and the maximum permitted life record.

15. The computer-readable storage medium of claim 14, wherein the location history record is further for indicating a plurality of different geographic locations including the geographical location, the plurality of different geographic location being where the life-limited part was located at different respective times.

16. The computer-readable storage medium of claim 14, further comprising a vehicle history record for indicating a vehicle in which the life-limited part was installed at a time.

17. The computer-readable storage medium of claim 14, further comprising a service record for indicating a service performed on the life-limited part, and for indicating when the life-limited part was serviced.

18. The computer-readable storage medium of claim 14, further comprising a cycle history for indicating a number of periodic operations involving the life-limited part.

19. The computer-readable storage medium of claim 14, further comprising an assembly history record for identifying a further life-limited part with which the life-limited part is combined into an assembly.

20. The computer-readable storage medium of claim 14, further comprising at least one incident history record for indicating at least one abnormal operational incident involving a part.

21. The computer-readable storage medium of claim 14, further comprising a further serial number record for indicating a further serial number associated with the life-limited part, wherein the further serial number record and the serial number record are linked to provide tracing between the further serial number record and the serial number record.

22. The computer-readable storage medium of claim 14, wherein the remaining life record comprises an in-service date and a maximum permitted life parameter associated with the part.

23. The computer-readable storage medium of claim 14, wherein the remaining life record comprises a field indicating whether to scrap the life-limited part.

* * * * *